(12) United States Patent
Steenburgh et al.

(10) Patent No.: US 7,167,576 B2
(45) Date of Patent: Jan. 23, 2007

(54) METHOD AND APPARATUS FOR MEASURING DWELL TIME OF OBJECTS IN AN ENVIRONMENT

(75) Inventors: Malcolm Steenburgh, Vancouver (CA); Don Murray, Vancouver (CA); Vladimir Tucakov, Vancouver (CA); Shyan Ku, Vancouver (CA); Rod Barman, Vancouver (CA)

(73) Assignee: Point Grey Research, Vancouver (CA)

( * ) Notice: Subject to any disclaimer, the term of this patent is extended or adjusted under 35 U.S.C. 154(b) by 597 days.

(21) Appl. No.: 10/187,438

(22) Filed: Jul. 2, 2002

(65) Prior Publication Data

US 2003/0002712 A1    Jan. 2, 2003

Related U.S. Application Data

(60) Provisional application No. 60/301,828, filed on Jul. 2, 2001.

(51) Int. Cl.
*G06K 9/00* (2006.01)

(52) U.S. Cl. .................. 382/103; 348/150; 348/169

(58) Field of Classification Search .............. None
See application file for complete search history.

(56) References Cited

U.S. PATENT DOCUMENTS

| 5,465,115 A | | 11/1995 | Conrad et al. ............. 348/155 |
|---|---|---|---|
| 5,473,368 A | * | 12/1995 | Hart ........................ 348/155 |
| 5,550,928 A | * | 8/1996 | Lu et al. .................... 382/116 |
| 5,953,055 A | | 9/1999 | Huang et al. .............. 348/155 |
| 5,969,755 A | * | 10/1999 | Courtney ................... 348/143 |
| 5,973,732 A | | 10/1999 | Guthrie ..................... 348/155 |
| 6,188,777 B1 | * | 2/2001 | Darrell et al. ............. 382/103 |
| 6,195,121 B1 | | 2/2001 | Huang et al. .............. 348/150 |
| 6,292,575 B1 | * | 9/2001 | Bortolussi et al. ......... 382/118 |
| 6,496,595 B1 | * | 12/2002 | Puchek et al. ............. 382/124 |
| 6,654,047 B2 | * | 11/2003 | Iizaka ....................... 348/143 |
| 6,747,687 B1 | * | 6/2004 | Alves ........................ 348/148 |

OTHER PUBLICATIONS

Lee et al. "Face Detection and Recognition using PCA", TENCON 99, Proceedings of the IEEE Region 10 Conference, Sep. 15-17, 1999, pp. 84-87.*

* cited by examiner

*Primary Examiner*—Brian Werner
*Assistant Examiner*—Christopher Lavin
(74) *Attorney, Agent, or Firm*—Oyen Wiggs Green & Mutala LLP

(57) ABSTRACT

A method for tracking objects entering and exiting an environment comprises providing stereo vision cameras positioned proximate to the paths to enter the environment, such that the stereo vision fields associated with the cameras substantially cover the paths. Using image data obtained by the stereo vision cameras, entry signatures are determined for objects entering the environment and exit signatures are obtained for objects exiting the environment. At any time after the determination of at least one exit signature, exit signatures are matched with the set of available entry signatures. Matching may be performed according to a variety of techniques.

40 Claims, 11 Drawing Sheets

METHOD AND APPARATUS FOR MEASURING DWELL TIME OF OBJECTS IN AN ENVIRONMENT

CROSS-REFERENCE TO RELATED APPLICATION

This application claims the benefit of the filing date of U.S. Application Ser. No. 60/301,828 filed Jul. 2, 2001, which is hereby incorporated by reference.

TECHNICAL FIELD

This invention relates to machine and computer vision and to recognition and tracking of objects. Particular embodiments of the invention provide methods and apparatus for determining the lengths of time that objects spend in an environment.

BACKGROUND

There exists a need to identify, recognize, count and/or track the movement of objects in an environment. For example, there is a need to determine how long people spend in retail stores or other commercial environments. When an object (e.g. a person, animal, vehicle or shopping cart) is tracked, useful information can be generated. For example, in a retail store application, useful information may be generated by tracking the movements of individuals through the store. Such useful information may include, for example: time that people spend viewing an advertisement or promotional display; the ratio of adults to children in a particular area; the number of people that view a promotional display today as compared to the same promotional display yesterday or last week; the duration of time that shoppers spend in a particular area; and the like. Such information can be helpful to generate additional information, such as desirable staffing allocations, traffic counts, shopper-to-purchaser ratios, etc.

Various prior art techniques have been proposed and developed to automate the counting and/or tracking of objects. Often, the applicability of these techniques depends on the environment in which the counting and/or tracking takes place.

One common technique for counting the movement of objects into or out of an environment involves the use of infrared beams. An infrared beam is directed from a source located on one side of an opening, such as a door, to a detector positioned on an opposite side of the opening. When the beam is interrupted by the movement of an object through its path, the system detects the passage of an object through the environment. Techniques of this type are not capable of detecting the direction of movement of objects through the environment, or identifying, recognizing or tracking particular objects.

Monocular vision systems comprising a video camera and a video processor can identify, detect and track the movements of objects. Such monocular vision systems identify and detect motion by monitoring successive image frames and recording the positions of distinctive groups of pixels. These distinctive groups of pixels may be identified as objects of interest that are found in successive image frames. If the position of a particular group of pixels changes between image frames, then the vision system detects movement of the corresponding object. Such systems can also track the motion of an object by analyzing successive image frames. The relative position of the group of pixels between successive image frames can be interpreted as movement of the associated object relative to the stationary background. The movement of the object may be tracked by recording the position of its group of pixels between successive image frames.

In operation, however, monocular vision systems are not very robust and can make mistakes in relation to the movement and/or identification of objects. In addition, monocular vision systems are limited to the detection of two-dimensional object features.

Stereo vision cameras, which generally comprise two (or more) cameras and a video processor, are also used for object identification, recognition and tracking applications. Such stereo vision cameras can detect three-dimensional properties of objects in their stereo vision field of view. Examples of commercially available stereo vision cameras include the DIGICLOPS™ and the BUMBLEBEE™ camera systems available from Point Grey Research Inc. of Vancouver, Canada. In addition to object identification, recognition and tracking, stereo vision cameras are used for a wide variety of applications, such as computer vision and object dimensioning.

A typical stereo vision camera comprises two spaced-apart monocular cameras. Some prior art stereo vision cameras have three or more monocular cameras. FIG. 1 shows a stereo vision camera 10 having two monocular cameras 11A and 11B. Preferably, although not necessarily, monocular cameras 11A and 11B are digital cameras. The distance b between camera 11A and camera 11B is referred to as the "baseline". Each of cameras 11A and 11B has an associated optical axis 16A and 16B and an associated field of view 12A and 12B. These fields of view 12A and 12B overlap one another in region 13, which is referred to as the "stereo vision field" or the "stereo vision field of view". In a stereo vision camera having three or more monocular cameras, the system's stereo vision field includes any region where the fields of view of two or more monocular cameras overlap. Stereo vision camera 10 comprises a processor 14, which receives image data from each monocular camera 11A and 11B. Using standard triangulation techniques and/or other well-known stereo vision techniques, processor 14 can determine three-dimensional features of an object (i.e. object 15) in the stereo vision field.

Stereo vision camera systems have been used to implement prior art tracking techniques. According to these prior art techniques, an environment is populated with a plurality of cameras having overlapping fields of view, such that the entire environment of interest is located within the system's stereo vision field of view. Tracking is then performed in a manner similar to that of monocular vision systems, except that three-dimensional features of the image data and three-dimensional object features may be used to identify, recognize and track the motion of objects.

These prior art stereo vision tracking techniques suffer from the disadvantage that the entire environment of interest must be within the system's stereo vision field. When the environment of interest is large, such tracking techniques can be prohibitively expensive, because a large number of cameras is required to provide adequate coverage of the environment of interest.

There is a need for cost effective techniques for tracking the movement of objects, such as people, animals, vehicles and/or other moveable objects, into and out of environments.

SUMMARY OF INVENTION

The invention provides a method for tracking objects entering and exiting an environment. The method comprises providing cameras positioned proximate to one or more paths into and/or out of the environment, such that the fields of view associated with the cameras substantially cover the paths. Using image data obtained by the cameras, entry signatures are determined for objects entering the environment and exit signatures are obtained for objects exiting the environment. At any time after obtaining at least one exit signature, one or more exit signatures are matched with the set of available entry signatures.

The cameras may be stereo vision cameras and the fields of view associated with the cameras which cover the paths may be stereo vision fields of view.

The objects tracked may be people, animals, vehicles and/or other moveable objects, such as shopping carts.

After matching entry and exit signatures, dwell times of objects in the environment may be determined.

Further aspects of the invention and features of specific embodiments of the invention are described below.

BRIEF DESCRIPTION OF DRAWINGS

In drawings, which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention disclosed herein relates to methods and apparatus for identifying, counting, recognizing, timing and/or tracking the movement of objects, which may include people, animals, vehicles and/or other moveable objects, into and out of an environment. The following description gives examples of the application of the invention to monitoring movements of people. The environment of interest may be a restricted access environment, where all of the possible paths by way of which an object can move into or out of the environment (or at least the paths of interest) are known. Throughout this description, the terms "path" and "paths" are used to describe entrances into an environment, exits out of the environment, and any passage or space that can function as either an entry to the environment, an exit from the environment or both. A doorway leading into or out of a store is one example of a path of the store, where the store is one example of an environment.

A tracking system employs a camera to monitor one or more paths of an environment of interest. The system counts the number of people entering the environment and records information characteristic of each of those people. The system also obtains information characteristic of the people exiting the environment and then uses the recorded information to match people exiting the environment with those that entered. Using information related to the entry and exit of people from the environment, the tracking system may determine other useful information, such as the time that individual people spent in the environment or other statistical information relating to the stays of people in the environment. The length of time that a person (or other object) spends in an environment may be called the "dwell time" of the person in the environment. The tracking system need not monitor the entirety of an environment of interest. The system may be implemented with a reduced amount of hardware and at a correspondingly lower cost relative to prior art stereo vision tracking systems, which provide cameras covering all of the environment.

Figure 1:
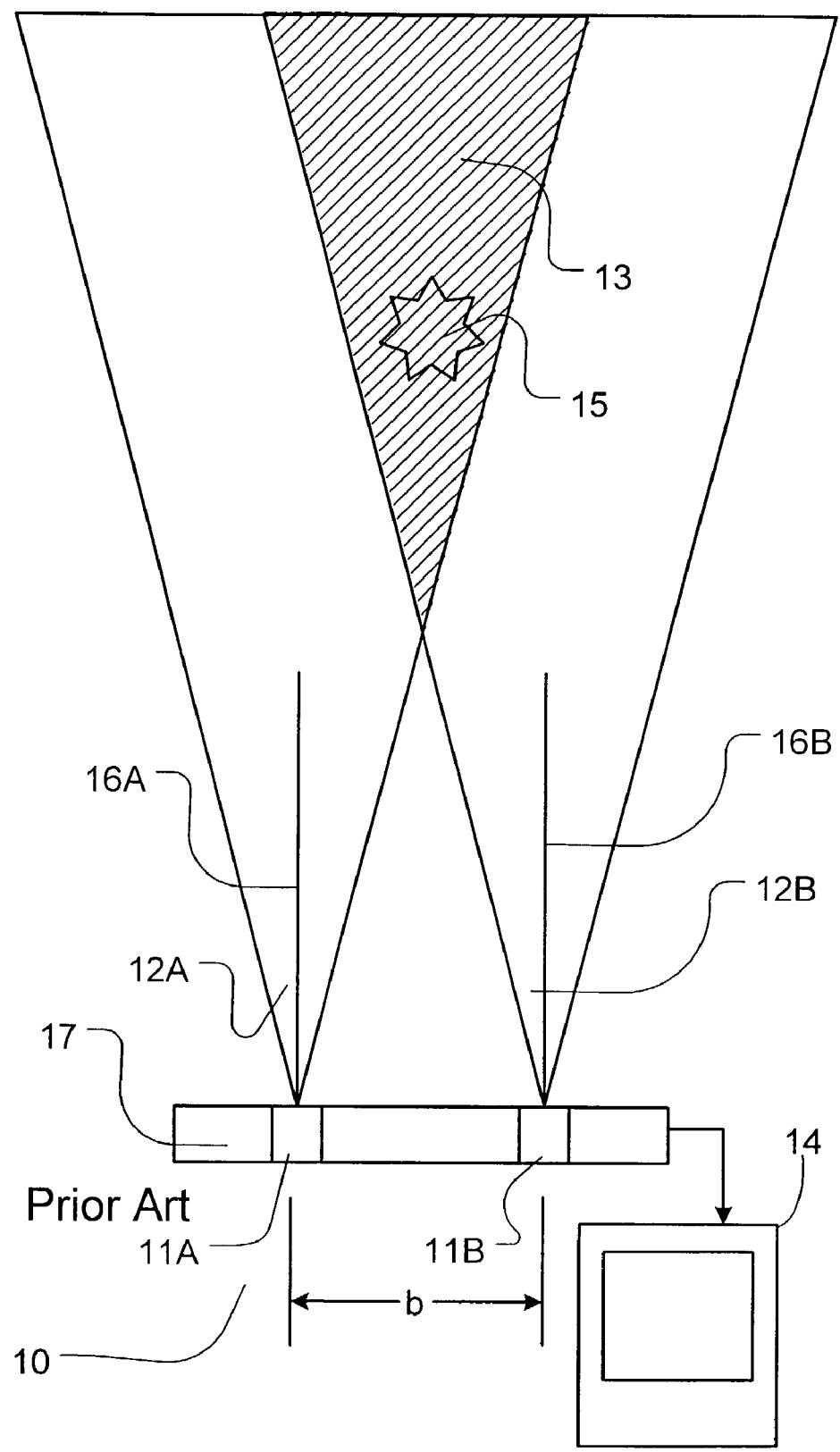
FIG. 1 is a schematic illustration of a stereo vision camera.
Figure 2:
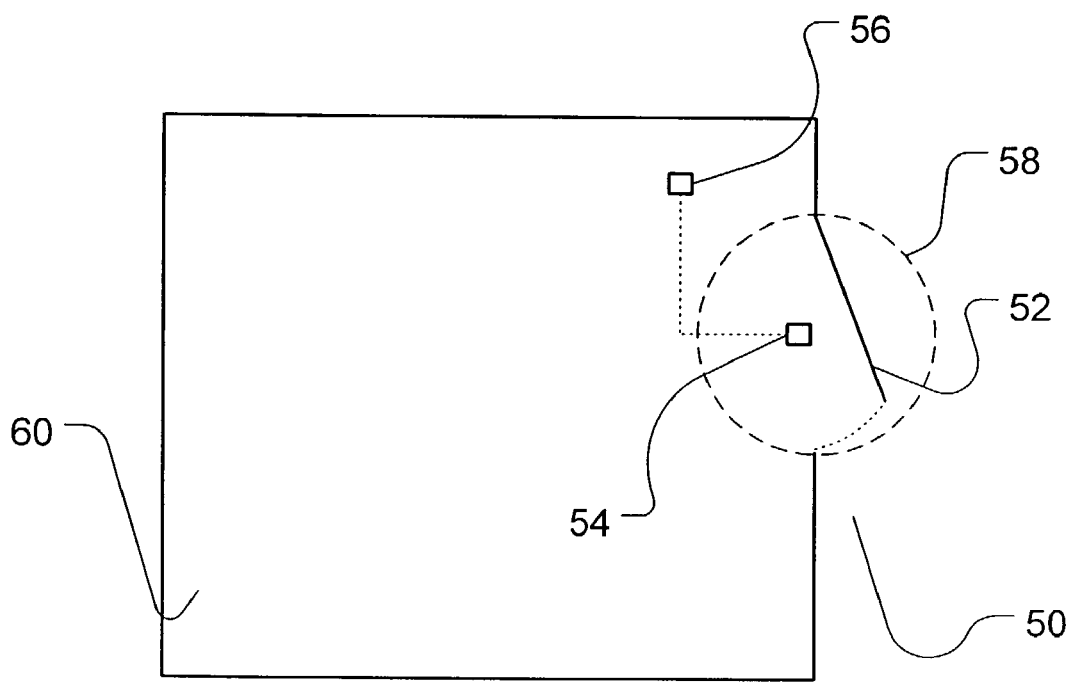
FIG. 2 shows a schematic top-down illustration of a particular embodiment of the invention which is deployed in an environment having a single entry/exit.

FIG. 2 is a top-down schematic illustration of a particular embodiment of a tracking system 50 according to the invention. Tracking system 50 is deployed in an environment 60 having a single path 52 by way of which people can enter or leave environment 60. Tracking system 50 comprises a stereo vision camera 54 which is controlled by a processor 56. Stereo vision camera 54 contains a plurality of monocular video cameras (not shown) and may be implemented in a manner the same or similar to that of stereo vision camera 10 depicted in FIG. 1. Preferably, the monocular video cameras used in stereo vision camera 54 are digital video cameras, but the invention may also be implemented using analog video cameras, whose images are converted to digital form.

Area 58 schematically depicts the stereo vision field of view of stereo vision camera 54. Stereo vision field 58 substantially covers path 52, such that no person may enter or leave environment 60 by way of path 52 without traveling through stereo vision field 58. In preferred embodiments, stereo vision camera 54 is mounted above path 52 in a downwardly pointing orientation. In general, however, stereo vision camera 54 may be mounted in any suitable location, provided that its stereo vision field 58 substantially covers path 52. It is preferable that camera 54 be located in a position such that one person standing in path 52 will not occlude another person or persons in path 52 from the view of camera 54.

Processor 56 processes information from stereo vision camera 54. Processor 56 may comprise a memory (not shown). In general, processor 56 may be implemented in many forms. For example, processor 56 may comprise any of: a computer executing software; a processor embedded in stereo vision camera 54 that is configured to execute instructions contained in a memory associated with the embedded processor; and a detachable processor that is attachable to, and detachable from, stereo vision camera 54 and that is configured to execute instructions contained in a memory associated with the detachable processor. Processor 56 may comprise image processing hardware and software. Processor 56 may also comprise a plurality or a combination of any such processors. Processor 56 may be implemented in any suitable manner and may receive image data from stereo vision camera 54 in any suitable manner.

The monocular cameras of stereo vision camera 54 each generate image data. In the case of digital cameras, the image data is captured directly in digital form. Otherwise analog image data may be converted to digital form. Processor 56 may receive the image data directly from the monocular cameras. Alternatively or additionally, some processing of the image data may occur prior to its receipt by processor 56. The image data may comprise a plurality of image frames, each of which represents image data captured at a particular time.

Figure 3:
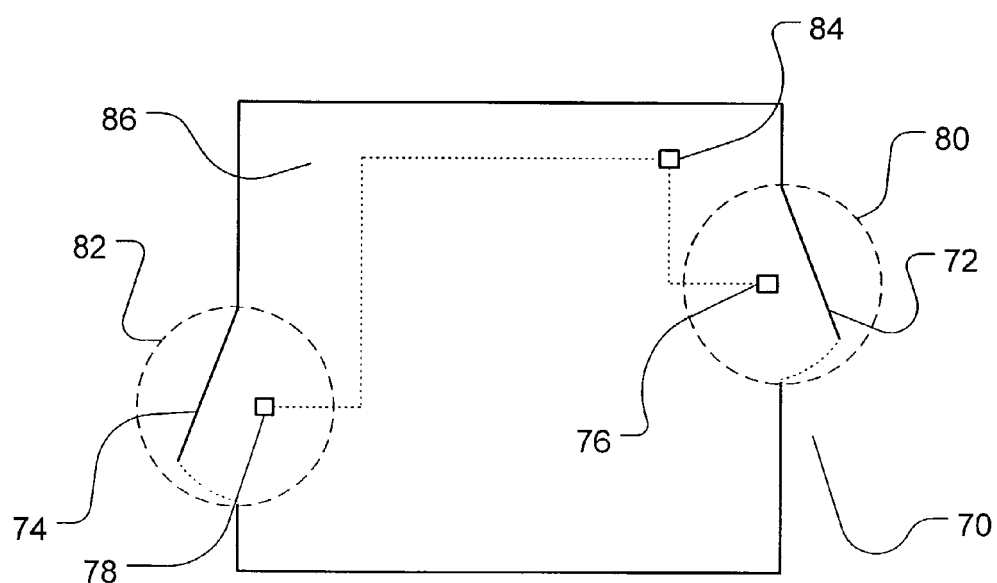
FIG. 3 is a top-down schematic illustration of another particular embodiment of the invention which is deployed in an environment having multiple entries/exits.

FIG. 3 is a top-down schematic illustration of tracking system 70 according to another embodiment of the invention. Tracking system 70 is deployed in an environment 86 having a plurality of paths 72 and 74 by way of which people can enter or leave environment 86. Tracking system 70 comprises a first stereo vision camera 76, associated with first path 72, and a second stereo vision camera 78, associated with second path 74. Area 80 is the stereo vision field of view of first stereo vision camera 76 and area 82 is the stereo vision field of second stereo vision camera 78. Stereo vision field 80 of first stereo vision camera 76 substantially covers path 72, such that no person may pass in either direction through path 72 without traveling through stereo vision field 80. Similarly, stereo vision field 82 of second stereo vision camera 78 substantially covers path 74, such that no person may pass in either direction through path 74 without traveling through stereo vision field 82.

In preferred embodiments, first and second stereo vision cameras 76 and 78 are mounted above their respective paths 72 and 74 in downwardly pointing orientations. In general, however, stereo vision cameras 76 and 78 may be mounted in any location, provided that their stereo vision fields 80 and 82 substantially cover their associated paths 72 and 74.

Each stereo vision camera 76, 78 may comprise a plurality of monocular video cameras (not shown) and may be implemented in a manner the same or similar to that of stereo vision camera 10 depicted in FIG. 1. Preferably, the monocular video cameras used in stereo vision camera 76 and 78 are digital video cameras, but the invention may also be implemented using analog video cameras, whose images are converted to digital form.

In the embodiment of FIG. 3, both stereo vision cameras 76 and 78 are in communication with a processor 84. Alternatively or in addition, stereo vision cameras 76 and 78 may each have their own processor (not shown), which may be in communication with the processor of the other stereo vision camera.

It will be appreciated by those skilled in the art that by adding more stereo vision cameras, the apparatus of FIG. 3 may be extended to environments having more than two paths. In addition, if the stereo vision field of a single stereo vision camera is sufficiently large, then the single stereo vision camera may be used to cover more than one path of an environment.

Figure 4:
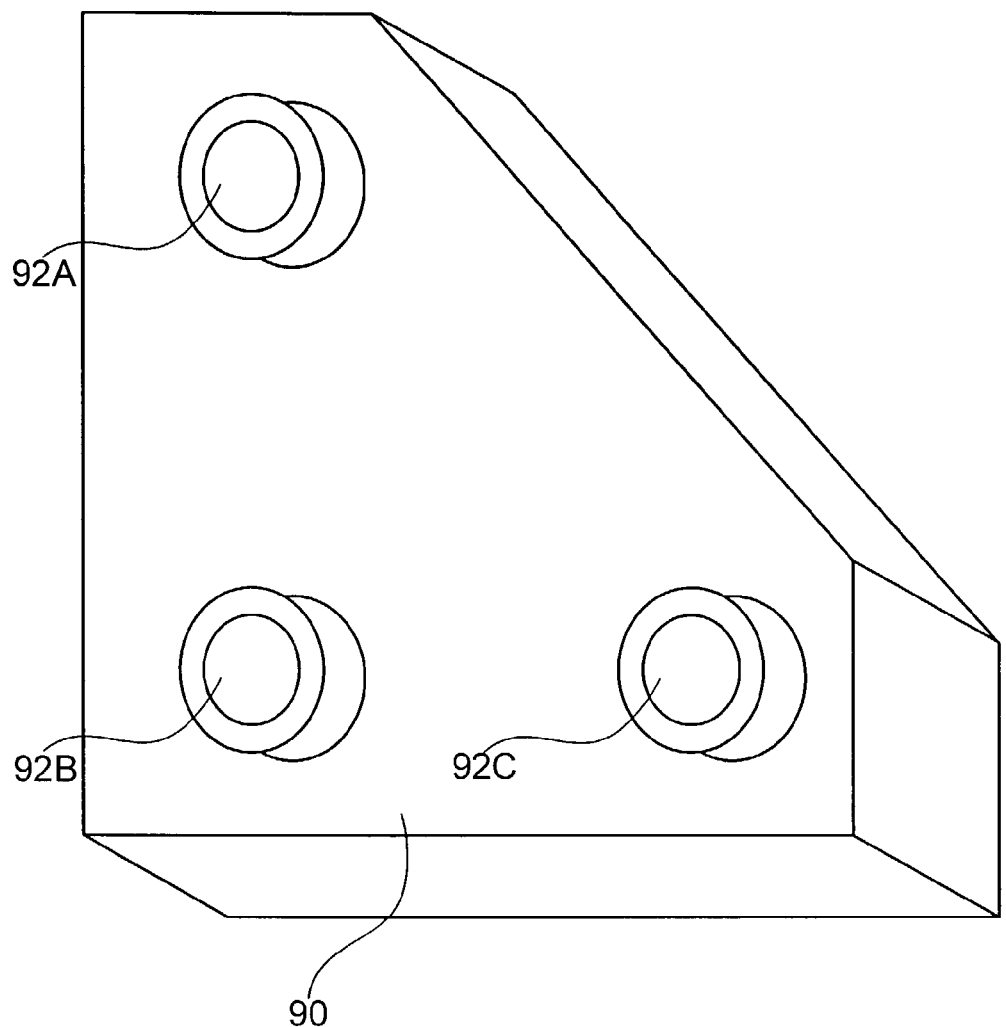
FIG. 4 is a particular embodiment of a stereo vision camera that may be used in the apparatus of FIG. 2 or FIG. 3.
Figure 5:
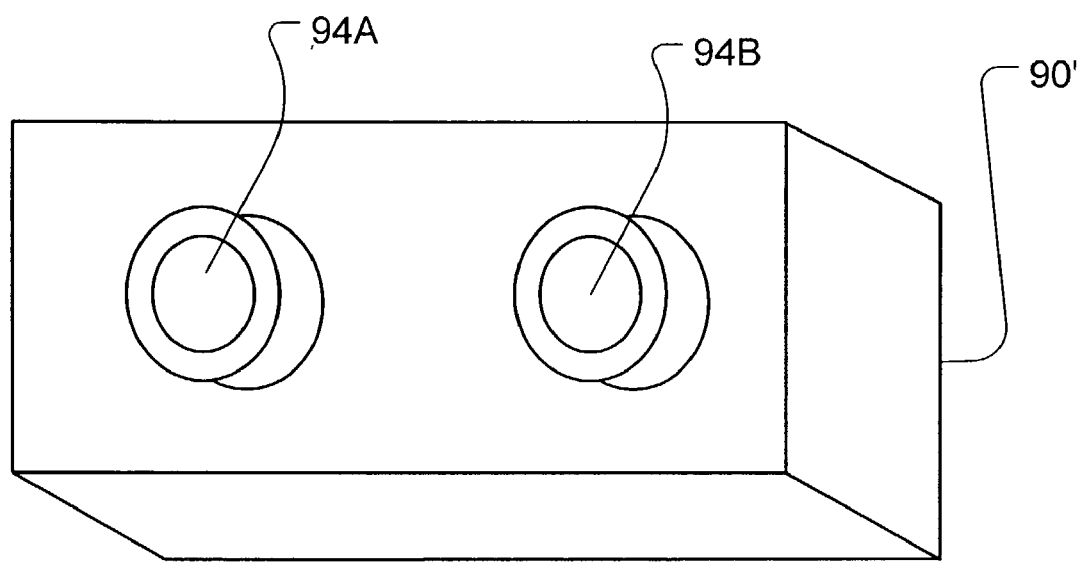
FIG. 5 is another embodiment of a stereo vision camera that may be used in the apparatus of FIG. 2 or FIG. 3.

FIG. 4 is an isometric view of one possible embodiment of a stereo vision camera 90 that could be used as stereo vision camera 54 in the apparatus of FIG. 2 or as either one of stereo vision cameras 76 and 78 in the apparatus of FIG. 3. Stereo vision camera 90 comprises three monocular digital video cameras 92A, 92B and 92C. Stereo vision camera 90 may be mounted above a path (i.e. such as path 52 of FIG. 2) to a ceiling or to some other overhead fixture, such that its stereo vision field (not shown) extends downward, substantially covering the path. FIG. 5 is an isometric view of another possible embodiment of a stereo vision camera 90' that could be used as stereo vision camera 54 in the apparatus of FIG. 2 or as either one of stereo vision cameras 76 and 78 in the apparatus of FIG. 3. Stereo vision camera 90' comprises two monocular digital video cameras 94A and 94B. Stereo vision camera 90' may be mounted above a path (i.e. such as path 52 of FIG. 2) to a ceiling or to some other overhead fixture, such that its stereo vision field (not shown) extends downward, substantially covering the path.

In another embodiment (not depicted), a stereo vision camera system (suitable for use as stereo vision camera 54 in the apparatus of FIG. 2 or as either one of stereo vision cameras 76 and 78 in the apparatus of FIG. 3) may be implemented using two (or more) distinct monocular cameras that are each in communication with a processor. For example, one monocular camera could be located on one side of a door frame, while a second monocular camera could be mounted on the opposing side of the door frame. Together, the two monocular cameras could provide a stereo vision camera system.

Figure 6:
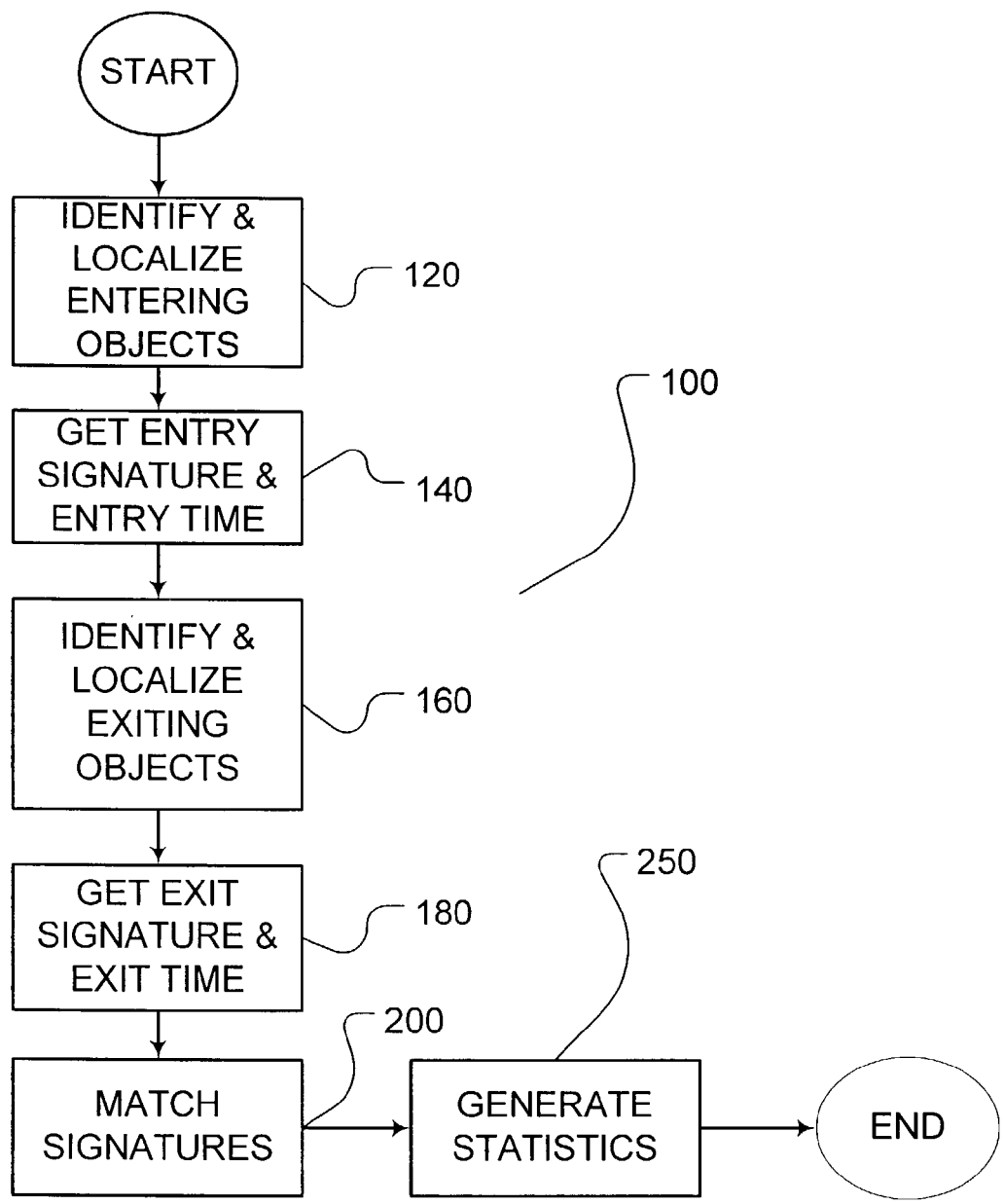
FIG. 6 is a flowchart illustrating a method for tracking the dwell time of objects in an environment according to one embodiment of the invention.

FIG. 6 illustrates a method 100 according to one particular embodiment of the invention. Method 100 tracks objects that enter and exit from an environment of interest. In particular, method 100 may be used to track the dwell time of people, animals, vehicles and/or other moveable objects, such as shopping carts, in the environment of interest. The following description of method 100 assumes that tracking system 70 is deployed in a restricted access environment 86 having two paths 72 and 74 as depicted in FIG. 3. Throughout tracking method 100, stereo vision camera 76 monitors path 72 and stereo vision camera 78 monitors path 74. It will be appreciated by those skilled in the art that the principles of method 100 may be easily extended to environments having a single path or to environments having three or more paths by varying the number of stereo vision cameras connected to processor 84.

In block 120, tracking system 70 identifies and localizes objects entering environment 86 by way of either of paths 72 and 74. For at least each entering object that is an object of interest, an entry signature vector is generated and an entry time is recorded in block 140. System 70 simultaneously monitors paths 72 and 74 in block 160 to identify and localize objects that are exiting environment 86 by way of either of paths 72 and 74. For at least each exiting object that is an object of interest, an exit signature vector is generated and an exit time is recorded in block 180. At any time, system 70 may execute a matching procedure in block 200 to obtain an optimum match between one or more of the exit signature vectors generated in block 180 and entry signature vectors generated in block 140.

After the entry signature vectors generated in block 140 are matched with the exit signature vectors generated in block 180, statistics may be generated in block 250. Among other useful statistics calculated in block 250, the dwell time of people in environment 86 may be determined by comparing the entry and exit times of each matched pair of signature vectors.

Figure 7:
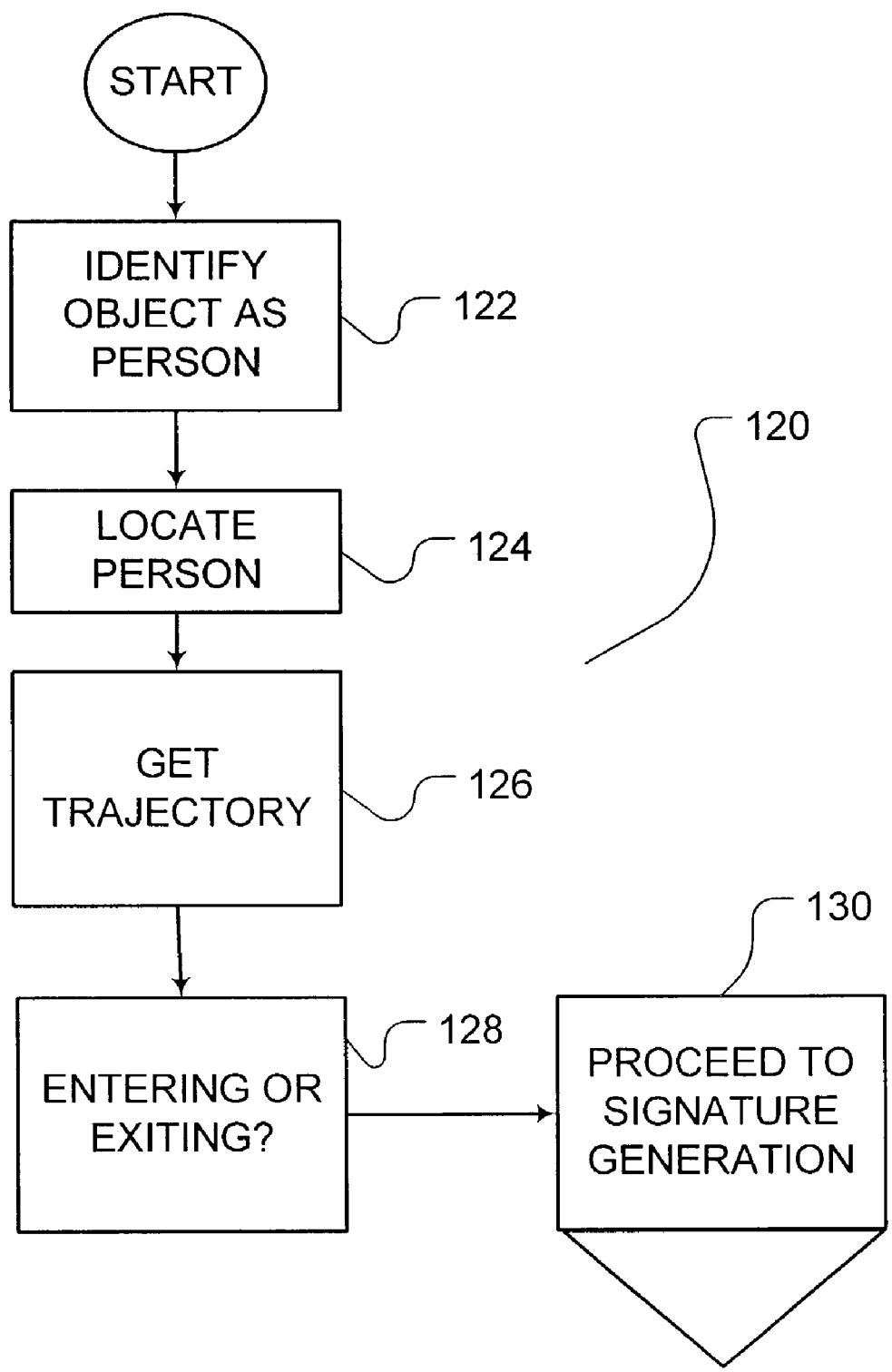
FIG. 7 is a flowchart illustrating a method for localization of poeple in accordance with one embodiment of the invention.

Block 120 of FIG. 6 involves identification and localization of objects that enter environment 86 through either one of paths 72 and 74. A particular embodiment of block 120 is depicted in FIG. 7. Stereo vision cameras 76 and 78 monitor paths 72 and 74 respectively and generate image data. Such image data may include three-dimensional image data relating to objects within stereo vision fields 80 and 82 of cameras 76 and 78 respectively. Using this image data, processor 84 executes software instructions which identify a moving object as a person in block 122. Such software may use various features of the image data to identify an object as a person. For example, it may be assumed that persons have heights in excess of 18 inches. Alternatively or in addition, such software may use two-dimensional or three-dimensional template matching techniques to identify an object as a person. An identification time may also be recorded in block 122 indicating the time that the person was identified.

The location of an identified person is obtained in block 124. The information obtained in block 124 may include a person's three-dimensional location and other three-dimensional image features. The three-dimensional location and other three-dimensional features of the person may be derived from the image data using well known stereo vision and image processing techniques, such as triangulation. If a person is identified in stereo vision field 80 associated with camera 76, then the location of the person and various other features of the person may be determined in the three-dimensional coordinate system of stereo vision camera 76. Similarly, if a person is identified in stereo vision field 82 associated with camera 78, then the location of the person and various other features of the person may be determined in the three-dimensional coordinate system of stereo vision camera 78.

The process of obtaining the person's location and various other features in block 124 may be repeated over a number of image frames. The person's trajectory may then be estimated in block 126. The trajectory obtained in block 126 may be a three-dimensional trajectory. The process of estimating the person's trajectory involves comparing the person's location over a number of image frames. The minimum number of image frames required to estimate a trajectory is two, but the accuracy of the calculated trajectory may be improved by incorporating the person's location from a larger number of image frames into the trajectory calculation. At a most basic level, estimating a person's trajectory comprises enough information to determine whether the person is entering or exiting environment 86.

In the field of machine and computer vision, there are a variety of known software and hardware processes and devices for object identification and for obtaining the trajectory of moving objects (as performed in blocks 122, 124 and 126 of FIG. 7). An example of a system that may be used to identify and obtain the trajectory of moving objects is the CENSYS3D™ system available from Point Grey Research, Inc. of Vancouver, Canada.

In block 128, the location and/or trajectory of a person may be used to decide whether the person is entering or exiting environment 86. In general, the person will enter or exit environment 86 through one of paths 72 and 74 and will, therefore, travel through one of stereo vision fields 80 and 82 associated with stereo vision cameras 76 and 78 respectively. In some embodiments, the location and trajectory of an identified person may be continuously tracked in blocks 124 and 126, until such time as that person exits the stereo vision field of the particular stereo vision camera. The decision in block 128 as to whether that person is entering or exiting environment 86 may then be made, at least in part, on the basis of the location where the person exits the stereo vision field, the person's trajectory when they exit the stereo vision field or both. In an alternative embodiment, the location and trajectory of a person may be determined relatively quickly in blocks 124 and 126 over a relatively small number of image frames. In such embodiments, the decision as to whether a person is entering or exiting environment 86 may also be made over a relatively small number of image frames. In particular, the determination as to whether a person is entering or exiting environment 86 may be made prior to the person leaving the relevant stereo vision field. After the entry or exit determination is made in block 128, system 70 proceeds to the signature generation procedure in block 130.

System 70 obtains entry signature vectors for people entering the environment in block 140 (see FIG. 6), such that each entering person has an associated entry signature vector. Such entry signature vectors may be generated from any available image data. Preferably, such entry signature vectors may be generated from features of three-dimensional image data that may be obtained while the person travels through one of stereo vision fields 80 and 82 on their way into environment 86. Examples of features of the image data that may be used to form a signature vector include, without limitation: the location of the person (as determined in block 124 of FIG. 7); the trajectory of the person (as determined in block 126 of FIG. 7); the time at which the person was identified (as determined in block 122 of FIG. 7); the height of the person; a color histogram generated from one or more images of the person; a shoulder width of the person; a two-dimensional image template of the person which may be based on a portion of one or more image frames containing the person; hair color of the person; iris characteristics of the person; a pattern of motion of the person; and face characteristics of the person. Such image features may be obtained from single frames or over a plurality of image frames.

Signature vectors may be generated from image data taken from multiple image frames. The use of multiple image frames allows for confidence measures to be placed on certain features of the image data. Confidence measures may be used to characterize certain features. Confidence measures may relate to the variance of a particular feature over a number of image frames. Confidence features may be included as additional component(s) of a signature vector. For example, if the height of a person is measured to be between 5'10" and 6'1" over a number of image frames (for example, because a person has a particular gait when they walk), then an average height of 5'11 ½" may be incorporated as a component of the signature vector for that person and a confidence measure of the height of that person may be incorporated as another component of the signature vector to indicate that the expected variance of the height of that person may be 3". In addition or as an alternative to providing a measure of the variance, confidence measures may be used to weight certain component(s) of a signature vector. For example, if a particular feature, such as the color histogram of a person, is detected to be relatively constant over successive image frames, then the component(s) of the entry signature vector resulting from the color histogram of the person may be more heavily weighted during the calculation of the signature vector than other components which are related to features that vary significantly between frames. Confidence measures may be assigned to selective image features, but not others. Confidence measures may be used, additionally or alternatively, during the matching process of block 200 as is discussed further below.

In addition to generating an entry signature vector, the time of entry of the person into environment 86 is recorded in block 140. The entry time may also be associated with, or included as a part of, each person's entry signature vector.

Figure 11:
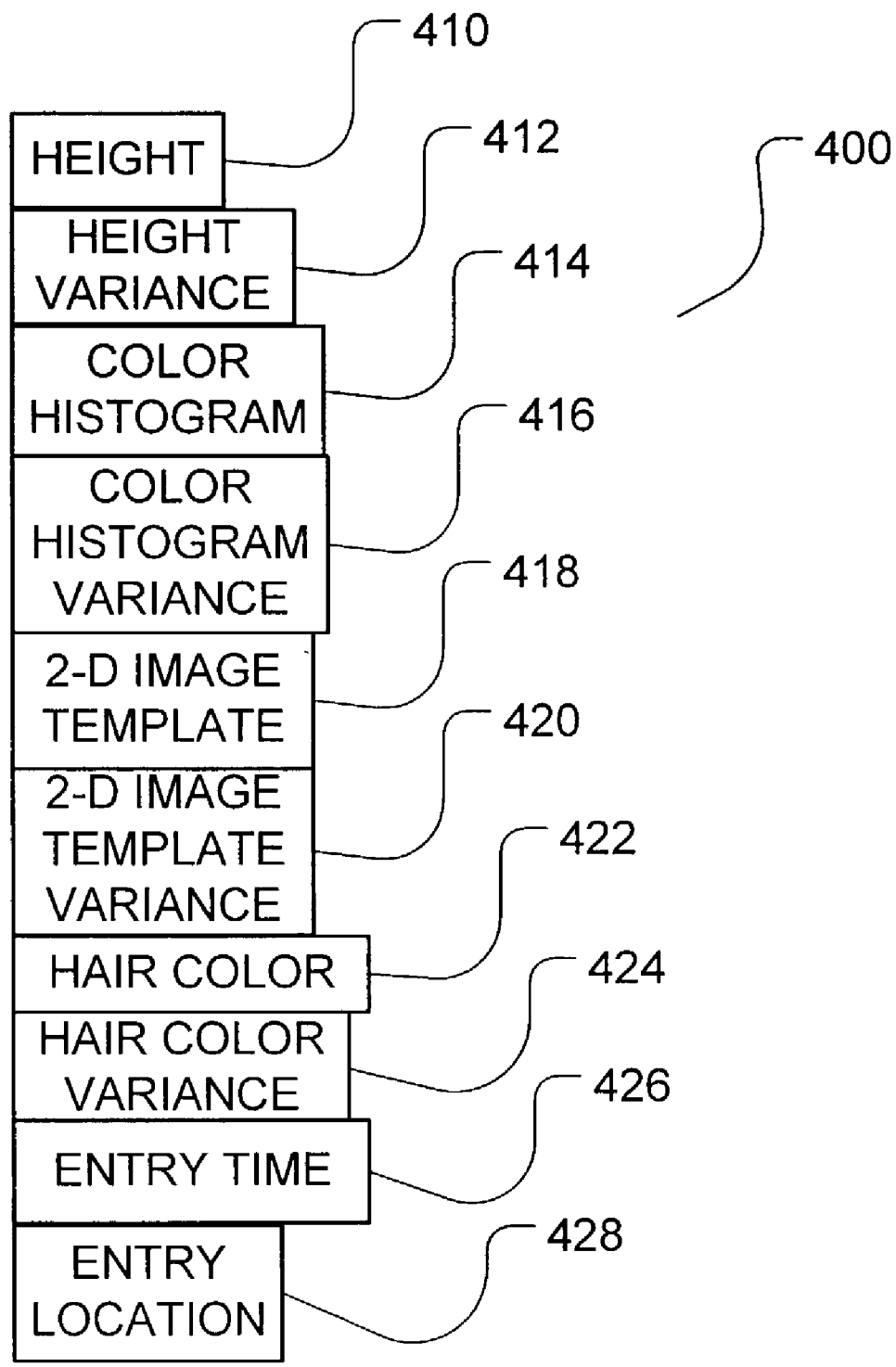
FIG. 11 is an example of a signature vector that could be used in accordance with the present invention.

An example of a signature vector 400 is shown in FIG. 11. Signature vector 400 has a number of components (410, 412, 414 . . . , 426, 428). In the illustrated example of vector 400: component 410 is a representation of the height of the person; component 412 is a representation of the variance of the height of the person; component 414 is a representation of a color histogram of the person; component 416 is a representation of the variance of the color histogram of the person; component 418 is a representation of the two-dimensional image template of the person; component 420 is a representation of the variance in the two dimensional image template of the person; component 422 is a representation of the hair color of the person; component 424 is a representation of the variance of the hair color of the person; component 426 is a representation of the time at which the person entered the environment of interest; and component 428 is a representation of the location of the person when they entered the environment of interest. In the illustrated embodiment, some of the measured features derived from the image data (i.e. components 410, 414, 418, and 422) are accompanied by confidence measures (i.e. components 412, 416, 420, and 424) indicating the variance of the measured feature. Other components (i.e. components 426 and 428), do not have associated confidence measures. Additionally or alternatively, certain components (not shown) of vector 400 may comprise functions of certain measured features, rather than the measured features themselves.

It will be appreciated by those skilled in the art that signature vector 400 of FIG. 11 is merely an example of a signature vector that may be used in accordance with the present invention. As discussed throughout this description, many other forms of signature vectors comprising many other types of components and components representing many other types of image and non-image features may be envisaged as part of the present invention.

As a part of block 120 and/or block 140, system 70 may optionally perform one or more checks on the image data. For example, in the case where system 70 is tracking more generalized objects, method 100 may involve verifying that an object in the image data has characteristics expected of an object of interest. Such a determination could be made on the basis of one or more features of the object (derived from the image data), prior to obtaining an entry signature vector for the object or recording the entry time for the object in block 140. Alternatively or additionally, this determination may be made on the basis of one or more characteristics of the entry signature vector determined in block 140. For objects not identified as being objects of interest, entry signature vectors may optionally not be obtained in block 140 or may simply not be recorded. In the alternative, data may be stored that is indicative of whether or not certain entry signature vectors obtained in block 140 correspond to objects of interest.

System 70 also monitors paths 72 and 74 for people that leave environment 86. The monitoring of paths 72 and 74 for people leaving environment 86 may occur simultaneously with the monitoring of paths 72 and 74 for people entering environment 86. People that leave environment 86 are identified and localized in block 160 (see FIG. 6) and exit signature vectors and exit times are generated for those people in block 180. The block 160 identification and localization process for people exiting environment 86 may be implemented in a manner that is substantially similar to the identification and localization process 120 for people entering environment 86 (see FIG. 7). Clearly, however, when identifying and localizing people that exit environment 86, the decision of block 128 should determine that the person is exiting. In block 180, exit signature vectors are calculated for each person that leaves environment 86. The process of exit signature vector calculation may be substantially similar to the calculation of entry signature vectors in block 140. In block 180, system 70 also records an exit time for each person. The exit time may also be associated with, or included as part of, the exit signature vector for that person. As a part of block 160 and/or block 180, system 70 may optionally perform one or more checks on the image data to determine whether objects exiting the environment are objects of interest. Such a determination may be done in a manner substantially similar to that described above in relation to the entry of objects into the environment.

At any given time, system 70 may execute a matching procedure in block 200. The matching procedure of block 200 attempts to match at least one exit signature vector obtained in block 180 with the set of entry signature vectors obtained in block 140.

The matching procedure of block 200 may be implemented via a variety of different techniques. The matching procedure of block 200 may be done in "real time", whereby as people exit from environment 86, their exit signature vectors (generated in block 180) are matched with the closest matching entry signature vector from among the set of available entry signature vectors (generated in block 140). The two matched signature vectors may then be excluded from further matching.

Alternatively or in addition, the matching procedure of block 200 may be done "off-line". Off-line matching may be performed after a pre-determined period of time, after a number of entry signature vectors and a number of exit signature vectors have been recorded. For example, such an off-line matching process may be performed in a retail store application at the end of the shopping day, when all of the customers and employees have left. In an off-line matching procedure, each of the available exit signature vectors may be matched with all of the available entry signature vectors to provide the best overall matching.

Alternatively or in addition, the matching procedure of block 200 may be performed "recursively", whereby as a person exits, that person's exit signature vector may be matched with an entry signature vector from among the set of available entry signature vectors (i.e. in real time). However, rather than removing the matched pair from further consideration, the quality of the matching of all of the previously matched pairs may be scrutinized as each person exits. If the overall matching of entry signature vectors and exit signature vectors could be improved, then a previously matched pair of signature vectors may be uncoupled and new matches may be made to provide the best overall match for the entire set of available entry signature vectors and the entire set of available exit signature vectors.

Alternatively or in addition, the matching procedure of block 200 may be performed at any time when there is a plurality of exit signature vectors and a plurality of entry signature vectors. In such a situation, the matching procedure of block 200 may obtain the best overall match between the set of available exit signature vectors and the set of available entry signature vectors at the time that it is executed. This "estimate" of the matching may be re-evaluated at a later time using an off-line matching procedure.

Preferably, at the end of a predetermined period of time (i.e. such as the end of a day), a final matching procedure 200 may be executed in an off-line mode, such that all of the available exit signature vectors may be matched with all of the available entry signature vectors. After the execution of such an off-line matching procedure, the entry and exit signature vectors may be purged from memory, so that the memory may be made available to accommodate additional entry and exit signature vectors when system 70 goes online again.

In some circumstances, such as when matching procedure 200 is called in an off-line scenario, the number of entry signature vectors may be the same as the number of exit signature vectors. An example of such a circumstance is when environment 86 is a retail store, paths 72 and 74 represent the only two ways into or out of environment 86 and matching procedure 200 is executed after all of the shoppers and employees have left the store. In such a situation, system 70 would have generated entry signature vectors (in block 140) for all of the employees and shoppers at the time that they entered the store and system 70 also would have generated exit signature vectors (in block 180) for all of the same people at the time that they left the store. As a result, the number of entry signature vectors should ideally be equal to the number of exit signature vectors when matching procedure 200 is performed.

In other circumstances, such as when matching procedure 200 is called in a real time or a recursive scenario, there may be different numbers of entry signature vectors and exit signature vectors. Taking the same retail store application for example, if matching procedure 200 is executed in the middle of the shopping day, then there may still be employees and shoppers in the store. At the time of execution of matching procedure 200, system 70 would have generated entry signature vectors for the people in the store (in block 140) at the time that they entered the store and also would have generated exit signature vectors (in block 180) for those people who have left the store. However, system 70 would not yet have generated exit signature vectors for those people who remain in the store. In these types of circumstances, matching procedure 200 may attempt to match any or all of the available exit signatures with a subset of the available entry signatures to obtain the best match for the available entry and exit signatures. Other examples of circumstances when the number of exit signature vectors may differ from the number of input signature vectors include situations where a moving object is improperly identified as a person during one of the identification procedures of block 120 or block 160 and situations where not all of the paths of the environment of interest are monitored.

Matching procedure 200 involves finding the best matches between one or more exit signature vectors and the available entry signature vectors. In real applications, matching may not be perfect. There may be cases which cause exit signatures to be matched with the wrong entrance signatures. These cases include situations where: (i) two or more entry signature vectors or two or more exit signature vectors may not be distinguishable from one another; (ii) entry signature vectors of a particular person may not match exactly with exit signature vectors of the same person (i.e. the entry and exit signature vectors may not be perfectly repeatable and/or the appearance of a person or other features of a person may change while the person is in the environment). For example, the person might put on or take off a hat or coat; (iii) the metric used to match entry signature vectors to exit signature vectors may be imperfect; and (iv) an entry signature or an exit signature is improperly generated for an object that is not an object of interest (i.e. one or more moving objects are falsely identified as people). Such deviations from ideal behavior will typically be acceptable if, overall, the system can generate reasonably reliable dwell time statistics.

Figure 8:
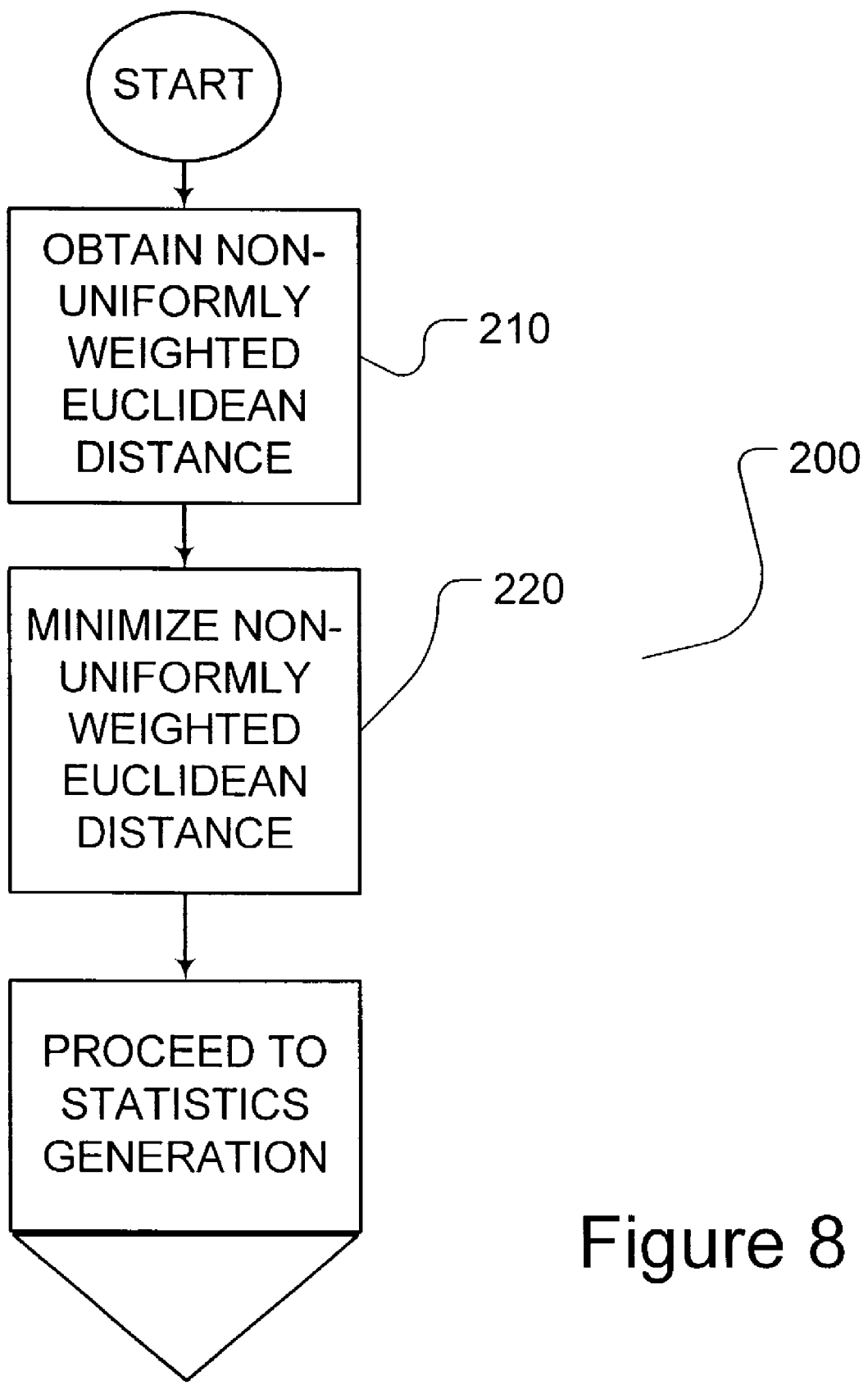
FIG. 8 is a flowchart illustrating a method for signature vector matching in accordance with one embodiment of the invention.

FIG. 8 shows a particular embodiment of a matching procedure 200 in accordance with the invention. In block 210, matching procedure 200 involves obtaining a metric indicative of a distance between one or more exit signature vectors and each of a set of entry signature vectors. The metric may comprise, for example, a non-uniformly weighted Euclidean distance between the set of entry signature vectors and the set of exit signature vectors to be matched. Depending on how matching procedure 200 is implemented, the set of exit signature vectors to be matched may include one or more exit signature vectors (i.e. in recursive or off-line matching procedures) or the set of exit signature vectors to be matched may include only one exit signature vector (i.e. real time matching procedures).

As discussed above, the entry and exit signature vectors may be based on a number of features obtained from captured image data. These features of the entry and exit signature vectors may be non-uniformly weighted during matching procedure 200 to optimize matching procedure 200 for different circumstances, for different viewing conditions and/or to emphasize particular distinctions between features. In addition, the matching procedure may be constrained by information that is known about certain image features or by the result that is sought to be achieved by matching. For example, in situations where one wants to distinguish between the entry or exit of children from adults, any height information that goes into the entry and exit signature vectors may be given increased weight when performing the matching procedure 200. In another example, it may be known or assumed that a person will only stay in the environment of interest for a time period between 1 minute and 1 hour. In such a situation, the time components of entry and exit signature vectors may be weighted to discourage matching of entry and exit signatures that fall outside of this time frame. Specific weighting techniques that may be used include, without limitation, prior modeling and/or weighting based on a Mahalanobis distance.

The confidence measures used in relation to signature vector generation (see above discussion) may also be used to provide non-uniform weighting of certain components of entry and exit signature vectors during matching procedure 200. For example, if it is determined that the level of confidence in the color histogram of an entry signature is fairly high, then component(s) of the signature vector related to color histogram may be weighted relatively highly during matching procedure 200.

Block 220 of matching procedure 200 involves minimizing the non-uniformly weighted Euclidean distance between the set of entry signature vectors and the set of exit signature vectors to be matched. This minimization process may be performed in various ways. In a brute force approach, every exit signature vector is compared to every entrance signature vector and the exit signature vectors are each paired with an entrance signature vector starting with the closest match.

Matching procedure 200 may attempt to provide a globally optimum solution over the set of available entry and exit signature vectors. That is, the preferred solution of matching process 200 may occur when the solution is optimized for all of the available entry and exit signature vectors, as opposed to any individual pairs of entry and exit signature vectors.

Certain implementations of the invention comprise computer processors which execute software instructions that cause the processors to perform a method of the invention. The invention may also be provided in the form of a program product. The program product may comprise any medium which carries a set of computer-readable signals comprising instructions which, when executed by a data processor, cause the data processor to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including, as equivalents of that component, any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

The description of the tracking system discussed above relates to the monitoring of people. It will be understood by those skilled in the art that the methods and apparatus described above are equally suitable for monitoring animals, vehicles or other moveable objects, such as shopping carts. The invention disclosed herein should be understood to have application to the identifying, counting, recognizing, timing and/or tracking the movement of generalized objects into and out of an environment.

The above description only discusses the use of stereo vision cameras and stereo vision camera systems to generate the image data and signature vectors used to implement the invention. More generally, however, a monocular camera could be located in the vicinity of a path, such that its field of view substantially covered the path. Such a monocular camera could be used to generate two-dimensional image data about objects entering and exiting the environment. Other sensors, which may be non-imaging sensors, such as one or more laser range finders, ultrasonic range finders, weight sensors or the like, could be positioned to obtain other information, such as height information, about objects entering and exiting the environment. Together, the data obtained from these devices could be used to generate suitable signature vectors representative of the objects entering and exiting the environment.

The system and method described above involve the use of stereo vision cameras and stereo vision camera systems to generate the image data and signature vectors used to implement the invention. Non-imaging sensors may be added to the stereo vision system described above to provide additional data that may be used to generate the signature vectors used to implement the invention. Non-imaging sensors may include, for example, laser range finders, ultrasonic range finders, weight sensors, or the like.

Method 100, depicted in FIG. 6 and described above, relates to a restricted access environment 86 having two paths 72 and 74 (see FIG. 3). It should be appreciated by those skilled in the art, that the invention described herein can easily be extended to environments having more than two paths or fewer than two paths.

In some applications, it may not be required to monitor all of the paths associated with a restricted access environment. For example, a retail environment may have a path to a stockroom and the entry and exit of people from the stockroom may not be of interest. In some applications, there may be a number of paths, some of which may be heavily used and others of which may be much more lightly used. In these and other types of applications, acceptable statistics may be obtained by monitoring certain path(s) (i.e. the heavily used path(s)) and ignoring other paths. Those skilled in the art will appreciate that the invention may be deployed over a number of paths associated with an environment, but that number of paths need not include all of the paths associated with the environment.

Figure 9:
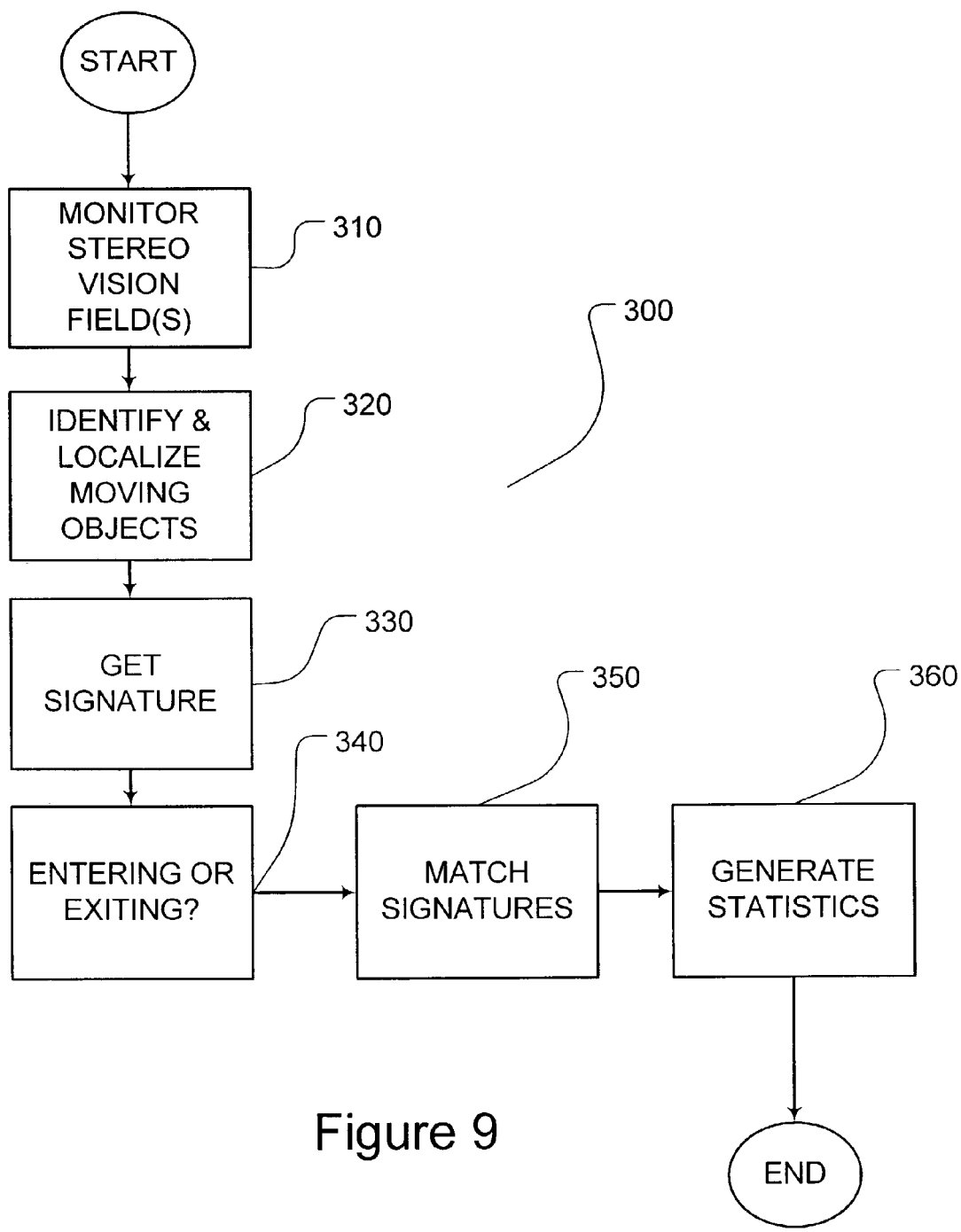
FIG. 9 is a flowchart illustrating a method for tracking the dwell time of objects in an environment according to another embodiment of the invention.

The embodiment of tracking method 100 depicted in FIG. 6 represents one possible embodiment of the method according to the present invention. Those skilled in the art will appreciate that there are many other techniques to implement a tracking method according to the present invention. FIG. 9 depicts an alternative method 300 for tracking the entry and exit of a person from an environment of interest. In method 300, the paths of the environment of interest are monitored constantly in block 310. Method 300 involves identifying moving objects as people and determining their locations and trajectories as part of block 320. A signature vector is generated for each entering and exiting person in block 330. In block 340, a decision is made as to whether the person is entering or exiting the environment of interest. The signature vectors for the exiting people may be matched with the signature vectors for the entering people at any time as a part of block 350. Useful statistics, such as the dwell time of a person in the environment may be determined in block 360.

Figure 10:
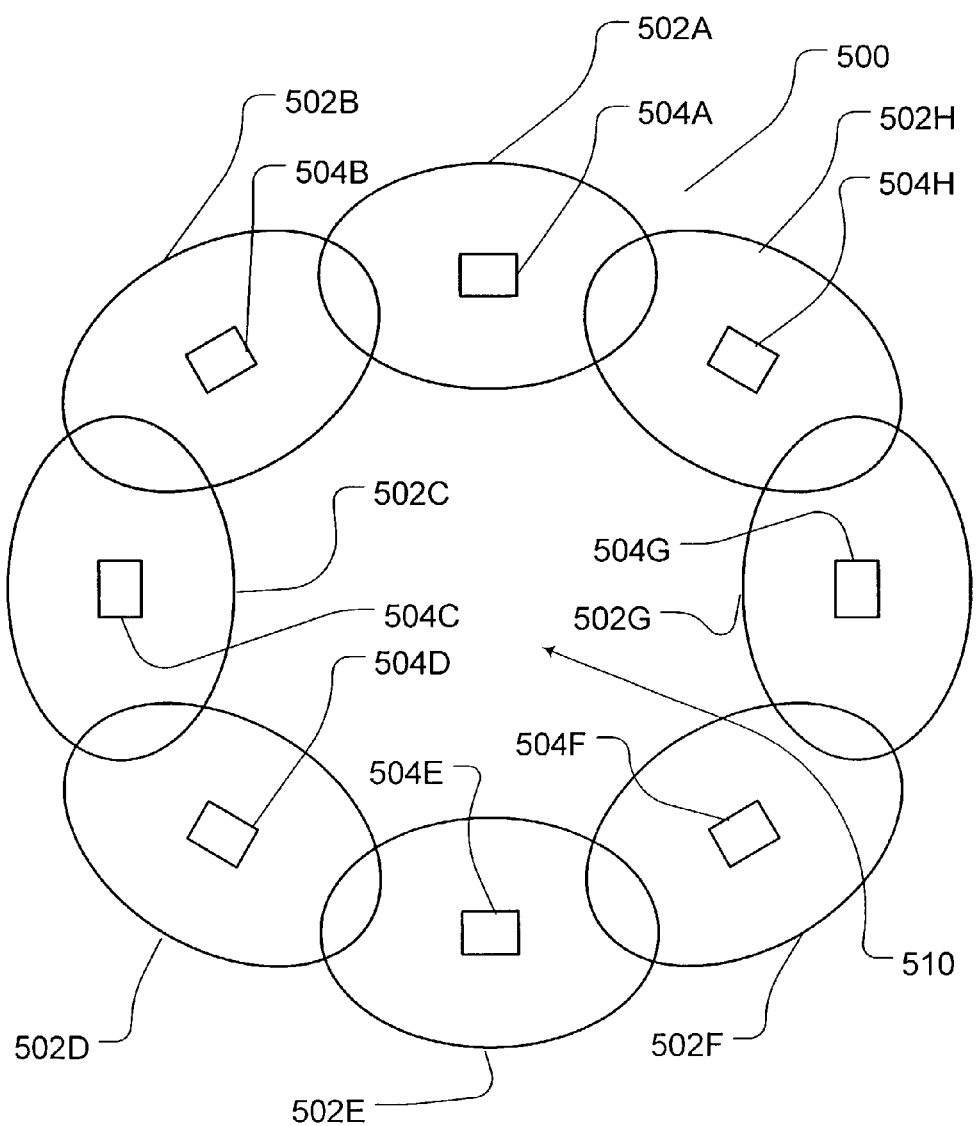
FIG. 10 is a top plan schematic view showing an arrangement of cameras in a particular embodiment of the invention which is deployed in an open environment.

The description of the invention discussed above relates to a restricted access environment. In general, however, the environment of interest need not be a restricted access environment if all or most possible paths to enter or exit the environment are covered by the stereo vision fields of stereo vision cameras. For example, FIG. 10 depicts an apparatus 500 according to an embodiment of the invention that is deployed to monitor an open environment 510. Open environment 510 is surrounded by a plurality of stereo vision cameras (504A, 504B, . . . 504H), each of which has an associated stereo vision field (502A, 502B, . . . 502H). Stereo vision fields (502A, 502B, . . . 502H) overlap one another and surround open environment 510, such that they may monitor the entrance and exit of people in a manner similar to that described above.

The methods described above need not be implemented in a particular order. For example, the methods depicted in FIGS. 6 and 7 suggest that a decision about whether a person is exiting or entering an environment of interest (block 128 of FIG. 7) is made prior to generating the signature vector for that person (block 140 of FIG. 6). Similarly, the method depicted in FIG. 9 shows that a signature vector is generated for each person (block 330) before a decision is made as to whether the person is entering or exiting the environment (block 340). The invention should be understood to be independent of the order in which these and other blocks are executed.

The use of entry signature "vectors" and exit signature "vectors" corresponds to particular embodiments of the invention where entry signatures and exit signatures take the form of vectors. In general, entry signatures and exit signatures need not be vectors and may take any form that is representative of the objects entering and exiting the environment of interest. For example, vector 400 of FIG. 11 need not necessarily be a "vector" by the precise mathematical definition. The components (410, 412, 414 . . . , 422, 424) of vector 400 may be non-scalar quantities. For example, a component of vector 400, such as component 410 representing the height of a person may itself be a vector representing the precise height measurements made from each image frame when the person was in the stereo vision field.

In some circumstances, an object entering or exiting the environment will be improperly identified as a person, or, more generally, as an object of interest. Such a circumstance is referred to as a "false positive" identification. In many cases, the present invention is used to acquire statistical data over a relatively large sample size. Consequently, a relatively small number of false positives does not generally cause significant problems.

Many of the examples provided above relate to retail store applications. It should be appreciated by those skilled in the art, that the invention described above has many other applications, such as: security applications, the monitoring of other public and private areas, monitoring vehicles in traffic congested environments, the monitoring of farm animals.

Accordingly, the scope of the invention is to be construed in accordance with the substance defined by the following claims.

What is claimed is:

1. A method for tracking objects entering and exiting an environment, the method comprising:
   obtaining image data for one or more fields of view covering one or more paths by way of which objects can enter or exit the environment wherein the objects are distinguishable from one another on the basis of one or more features in the image data;
   identifying objects of interest represented in the image data;
   for each of the objects, determining from the image data whether the object is entering or exiting the environment and generating a signature for the object based, at least in part, on the image data; and
   after generating one or more entry signatures for objects determined to be entering the environment and at least one exit signature for objects determined to be exiting the environment, matching the at least one exit signature to the one or more entry signatures, such that each matched exit signature corresponds with one matched entry signature;
   wherein matching the at least one exit signature to the one or more entry signatures comprises, after generating each of the at least one exit signatures for objects determined to be exiting the environment: matching the exit signature to the one or more entry signatures to identify a corresponding entry signature that provides a best match to the exit signature; and, after identifying the corresponding entry signature, checking a plurality of previously matched exit signatures and corresponding previously matched entry signatures to determine whether rematching one or more of the previously matched exit signatures would provide better overall matching between a plurality of available exit signatures and the one or more entry signatures.

2. A method according to claim 1 wherein, for each of the objects, determining from the image data whether the object is entering or exiting the environment comprises tracking a position of the object within a field of view over a plurality of image frames to determine a trajectory of the object.

3. A method according to claim 2, wherein, for each of the objects, determining from the image data whether the object is entering or exiting the environment is based, at least in part, on the position of the object when it leaves the field of view.

4. A method according to claim 3, wherein the image data comprises three-dimensional stereoscopic image data and the fields of view are stereo vision fields and wherein generating one or more entry signatures for objects determined to be entering the environment and at least one exit signature for objects determined to be exiting the environment comprises, for each entry and exit signature, determining a parameter indicative a height of a corresponding object from the three-dimensional stereoscopic image data.

5. A method according to claim 3, wherein the objects of interest are persons.

6. A method according to claim 1, wherein generating a signature for the object comprises assigning one or more confidence measures to features of the image data, each such confidence measure being based on the uniformity of an associated feature of the image data over a plurality of image frames.

7. A method according to claim 6, wherein each of the one or more confidence measures is representative of a variance of the associated feature of the image data.

8. A method according to claim 7, wherein generating a signature for the object comprises including one or more confidence measures as components of the signature for the object.

9. A method according to claim 6, wherein the image data comprises three-dimensional stereoscopic image data and the fields of view are stereo vision fields and wherein generating one or more entry signatures for objects determined to be entering the environment and at least one exit signature for objects determined to be exiting the environment comprises, for each entry and exit signature, determining a parameter indicative a height of a corresponding object from the three-dimensional stereoscopic image data.

10. A method according to claim 6, wherein the objects of interest are persons.

11. A method according to claim 2, wherein the image data comprises three-dimensional stereoscopic image data and the fields of view are stereo vision fields and wherein generating one or more entry signatures for objects determined to be entering the environment and at least one exit signature for objects determined to be exiting the environment comprises, for each entry and exit signature, determining a parameter indicative a height of a corresponding object from the three-dimensional stereoscopic image data.

12. A method according to claim 11, wherein the objects of interest are persons.

13. A method according to claim 12, wherein generating a signature for the object is based, at least in part, on features of the image data, the features of the image data comprising one or more of: a height of the person; a shoulder width of the person; a shape of the person; a trajectory of the person;

a location of the person; a color histogram of the person; a two-dimensional image template of the person; hair color of the person; a sex of the person; iris characteristics of the person; and facial characteristics of the person.

14. A method according to claim 12, wherein generating a signature for the object is based, at least in part, on data obtained from one or more non-image data producing sensors, which are positioned to measure characteristics of objects entering or exiting the environment by way of the paths.

15. A method according to claim 11, wherein generating a signature for the object is based, at least in part, on data obtained from one or more non-image data producing sensors, which are positioned to measure characteristics of objects entering or exiting the environment by way of the paths.

16. A method according to claim 15, wherein the one or more non-image data producing sensors comprise at least one of: a laser range finder; a ultrasonic distance sensor; and a weight sensor.

17. A method according to claim 11, wherein the objects of interest are one or more of: animals, vehicles and shopping carts.

18. A method according to claim 2, wherein the objects of interest are persons.

19. A method according to claim 18, wherein generating a signature for the object is based, at least in part, on data obtained from one or more non-image data producing sensors, which are positioned to measure characteristics of objects entering or exiting the environment by way of the paths.

20. A method according to claim 18, wherein the objects of interest are one or more of: animals, vehicles and shopping carts.

21. A method according to claim 2, wherein generating a signature for the object is based, at least in part, on data obtained from one or more non-image data producing sensors, which are positioned to measure characteristics of objects entering or exiting the environment by way of the paths.

22. A method according to claim 21, wherein the objects of interest are one or more of: animals, vehicles and shopping carts.

23. A method according to claim 2, wherein the objects of interest are one or more of: animals, vehicles and shopping carts.

24. A method according to claim 1, wherein matching the exit signature to the one or more entry signatures comprises removing the exit signature and the corresponding entry signature from any subsequent matching.

25. A method according to claim 1 comprising, after identifying the corresponding entry signature, checking a plurality of previously matched exit signatures and corresponding previously matched entry signatures to determine whether any of the previously matched entry signatures would be a better match to the exit signature than the corresponding entry signature.

26. A method according to claim 1, wherein matching a plurality of exit signatures to the one or more entry signatures comprises matching a number of exit signatures to an equal number of entry signatures.

27. A method according to claim 1, wherein matching a plurality of exit signatures to the one or more entry signatures comprises matching a number of exit signatures to an unequal number of entry signatures.

28. A method according to claim 1, wherein matching the at least one exit signature to the one or more entry signatures comprises weighting each of a plurality of components of the entry and exit signatures.

29. A method according to claim 28, wherein weighting each of a plurality of components of the entry and exit signatures comprises non-uniformly weighting components of the entry and exit signatures.

30. A method according to claim 28, wherein the objects of interest are persons.

31. A method according to claim 1, wherein matching the at least one exit signature to the one or more entry signatures comprises minimizing a metric representative of a Euclidean distance between the at least one exit signature and the one or more entry signatures.

32. A method according to claim 31, wherein minimizing a metric representative of a Euclidean distance between the at least one exit signature and the one or more entry signatures comprises applying non-uniform weighting to components of the metric.

33. A method according to claim 31, wherein minimizing a metric representative of a Euclidean distance between the at least one exit signature and the one or more entry signatures comprises applying non-uniform weighting to components of the entry and exit signatures.

34. A method according to claim 31, wherein the objects of interest are persons.

35. A method according to claim 1 comprising:
recording an entry time for each of the objects determined to be entering the environment and associating the entry time with the entry signature for that object;
recording an exit time for each of the objects determined to be exiting the environment and associating the exit time with the exit signature for that object; and
after matching the at least one exit signature to the one or more entry signatures, determining a dwell time for one or more objects corresponding to matched pairs of entry and exit signatures.

36. A method according to claim 35, wherein the objects of interest are persons.

37. A method according to claim 1, wherein the image data comprises three-dimensional stereoscopic image data and the fields of view are stereo vision fields and wherein generating one or more entry signatures for objects determined to be entering the environment and at least one exit signature for objects determined to be exiting the environment comprises, for each entry and exit signature, determining a parameter indicative a height of a corresponding object from the three-dimensional stereoscopic image data.

38. A method according to claim 1, wherein generating a signature for the object is based, at least in part, on features of the image data, the features of the image data comprising one or more of: a shape of the object; a location of the object; a transverse dimension of the object; a trajectory of the object; a color histogram of the object and a two-dimensional template of the object.

39. A method according to claim 38, wherein the objects of interest are persons.

40. A method according to claim 1, wherein the objects of interest are persons.

* * * * *